United States Patent
Su

(10) Patent No.: US 12,043,190 B2
(45) Date of Patent: Jul. 23, 2024

(54) CABLE TIE DEVICE, CABLE TIE CONNECTION STRUCTURE, BATTERY AND ELECTRICAL APPARATUS

(71) Applicant: CONTEMPORARY AMPEREX TECHNOLOGY CO., LIMITED, Ningde (CN)

(72) Inventor: Jiangang Su, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/407,733

(22) Filed: Jan. 9, 2024

(65) Prior Publication Data

US 2024/0149805 A1 May 9, 2024

Related U.S. Application Data

(63) Continuation of application No. PCT/CN2022/070317, filed on Jan. 5, 2022.

(51) Int. Cl.
*B60R 16/02* (2006.01)
*B65D 63/00* (2006.01)
(Continued)

(52) U.S. Cl.
CPC ........... *B60R 16/0215* (2013.01); *H02G 3/32* (2013.01); *B65D 63/00* (2013.01); *F16L 3/08* (2013.01); *F16L 3/233* (2013.01); *H02G 3/36* (2013.01)

(58) Field of Classification Search
CPC .. H02G 3/32; H02G 3/36; H02G 3/26; H02G 3/02; H02G 7/05; B65D 63/00;
(Continued)

(56) References Cited

U.S. PATENT DOCUMENTS 3,819,139 A * 6/1974 Jemison ............... F16L 3/14
24/339
4,447,934 A * 5/1984 Anscher ............... H02G 3/30
248/74.3
(Continued)

FOREIGN PATENT DOCUMENTS

CN 201322141 Y * 10/2009
CN 102765547 A 11/2012
(Continued)

OTHER PUBLICATIONS

ISR for International Application No. PCT/CN2022/070317 mailed Sep. 28, 2022.
(Continued)

*Primary Examiner* — Tan Le
(74) *Attorney, Agent, or Firm* — Ladas & Parry LLP

(57) ABSTRACT

A cable tie device, a cable tie connection structure, a battery, and an electrical apparatus are described. The cable tie device includes: a body part provided with a first through hole; a limiting part arranged on a first side of the body part in an extending direction of the first through hole; at least two deformable connecting bars having first ends connected to the limiting part and second ends connected to a side surface, towards the limiting part, of the body part, and distributed on the periphery of the first through hole at intervals; a first strap with a first end connected to the limiting part and a second end penetrating through the first through hole; and a second strap connected to the body part.

19 Claims, 5 Drawing Sheets

(51) Int. Cl.
*F16L 3/08* (2006.01)
*H02G 3/32* (2006.01)
*F16L 3/233* (2006.01)
*H02G 3/36* (2006.01)

(58) Field of Classification Search
CPC ... F16L 3/233; F16L 3/137; F16L 3/08; F16L 3/12; Y10T 24/1498
See application file for complete search history.

(56) References Cited

U.S. PATENT DOCUMENTS

| | | | | |
|---|---|---|---|---|
| 4,458,385 | A | * | 7/1984 | Espinoza .................. F16B 2/08 24/17 AP |
| 5,386,615 | A | * | 2/1995 | Bernard .................. F16L 3/233 24/17 AP |
| 5,730,399 | A | * | 3/1998 | Baginski ................ H02G 3/263 248/68.1 |
| 7,229,052 | B2 | * | 6/2007 | Takeuchi .............. F16B 21/088 24/17 AP |
| 2011/0162171 | A1 | * | 7/2011 | Gmeilbauer ............ F16B 5/065 24/16 R |

FOREIGN PATENT DOCUMENTS

| | | | | |
|---|---|---|---|---|
| CN | 202728884 | U | | 2/2013 |
| CN | 209282339 | U | | 8/2019 |
| EP | 756365 | B1 | * | 12/1999 ............. F16L 3/137 |
| JP | 11205967 | A | * | 7/1999 |
| JP | 11205967 | A | | 7/1999 |
| JP | 2010172168 | U | | 8/2010 |
| JP | 3174229 | U | | 3/2012 |

OTHER PUBLICATIONS

Written Opinion for International Application No. PCT/CN2022/070317 mailed Sep. 28, 2022.

* cited by examiner

CABLE TIE DEVICE, CABLE TIE CONNECTION STRUCTURE, BATTERY AND ELECTRICAL APPARATUS

CROSS-REFERENCE TO RELATED APPLICATIONS

This application is a continuation of International application PCT/CN2022/070317 filed on Jan. 5, 2022, the subject matter of which is incorporated herein in its entirety.

TECHNICAL FIELD

The present application relates to the technical field of bundling tools, and more particularly relates to a cable tie device, a cable tie connection structure, a battery and an electrical apparatus.

BACKGROUND

Batteries such as lithium-ion batteries have been widely used because of their advantages such as high energy density, high power density, high frequency of cycle use, and long storage time. In order to realize electrical connection, there are many wire harnesses in the battery, and in order to reliably fix the wire harnesses, a cable tie structure is generally adopted to fix the wire harnesses.

However, current cable tie structures are difficult to assemble and disassemble.

SUMMARY

The objective of the present application is to facilitate assembly and disassembly of a cable tie device.

According to a first aspect of the present application, a cable tie device is provided and includes:

a body part provided with a first through hole;

a limiting part arranged on a first side of the body part in an extending direction of the first through hole;

at least two connecting bars with respective first ends connected to the limiting part and respective second ends connected to a first side surface, towards the limiting part, of the body part, where the connecting bars are distributed on the periphery of the first through hole at intervals and are deformable;

a first strap located between the at least two connecting bars, where a first end of the first strap is connected to the limiting part, and a second end of the first strap penetrates through the first through hole; and a second strap connected to the body part, where the first strap is configured to be movable in the first through hole so as to drive the limiting part to approach the body part, such that the at least two connecting bars can outwards deform and protrude in a radial direction of the first through hole, and when the first strap and the second strap are in a connection state, the member to be fixed is fixed.

In this embodiment, the body part of the cable tie device is fixed to the mounting plate through deformation of the connecting bars, which is easy to install and not prone to disengaging due to firm installation, and an installer does not need to apply great force. Moreover, after the connecting bars recover to an initial state, the cable tie device can be dismounted, which can prevent the mounting plate from being damaged or prevent part of structures of the cable tie device from remaining in the mounting plate. Therefore, the kind of cable tie device is convenient to disassemble and assemble, which can improve disassembly and assembly efficiency and reduce operation difficulty.

In some embodiments, the size of the first through hole is constructed to prevent the limiting part from arriving at a second side of the body part in the extending direction of the first through hole.

In this embodiment, after the member to be fixed is fixed, the limiting part abuts against the first side surface of the body part, such that the first side surface of the body part prevents the limiting part from coming out of the first through hole, the at least two connecting bars may be kept in a deformation state to prevent structure failures of a blooming structure formed by the connecting bars, and accordingly, the body part is jointly limited by the connecting bars and the limiting part from leaving the mounting plate, thereby improving fixing reliability of the cable tie device.

In some embodiments, a cross section of each connecting bar is in an arc shape, and the arc protrudes outwards.

In this embodiment, the connecting bars are in the arc shape and protrude outwards before deformation. When the first strap is pulled outwards by external force to make the limiting part get close to the body part, it becomes easier for the at least two connecting bars to protrude outwards in the radial direction of the first through hole and deform, which can prevent inward bending deformation of part of the connecting bars due to unbalanced stress and reduce operation difficulty.

In some embodiments, the body part is of a flat plate structure.

In this embodiment, when the member to be fixed is fixed to the mounting plate through the cable tie device, the whole first side surface of the body part can be attached to the mounting plate, such that the body part is more stably fixed to the mounting plate, the cable tie device is prevented from shaking after the member to be fixed is fixed, and fixing reliability can also be improved even when the cable tie device is subject to vibration or impact.

In some embodiments, the at least two connecting bars are evenly distributed in a circumferential direction of the first through hole and are equal in length.

In this embodiment, when the first strap is pulled outwards, the connecting bars can be subject to balanced stress and are likely to deform at the same time, and meanwhile, the deformation of outward protrusion of the connecting bars is consistent, which can improve fixing reliability of the body part on the mounting plate.

In some embodiments, the second strap is connected to a position, located on a side surface of the first through hole, of the body part, at least one of the first strap and the second strap is deformable, and when the first strap and the second strap are connected, the first strap and the second strap get close to each other and are connected through deformation of at least one of them, so as to form a ring with the body part for the member to be fixed to penetrate through.

In this embodiment, the second strap is connected to a side portion of the body part, such that the ring can be formed after the first strap and the second strap are connected to accommodate the member to be fixed. Moreover, at least one of the first strap and the second strap is made of the flexible materials, such that respective free ends of the first strap and the second strap are likely to get close to each other to be connected, and the size of the ring can be conveniently adjusted according to the radial size of the member to be fixed, thereby conveniently fixing the member to be fixed.

In some embodiments, the second strap includes:
a connecting section with a first end connected to the body part; and
a snapping part connected to a second end of the connecting section and provided with a snapping hole, where the second end of the first strap penetrates through the snapping hole so as to be connected to the second strap.

In this embodiment, the first strap and the second strap can be conveniently connected, and during connection, the member to be fixed can be fastened by adjusting the length that the second end of the first strap penetrates through the snapping hole.

In some embodiments, the snapping hole is located in the side, close to the limiting part, of the connecting section.

In this embodiment, after the second end of the first strap penetrates through the snapping hole, the snapping part can be prevented from occupying an internal area of the ring, such that the first strap and the second strap better wrap the member to be fixed, and accordingly, the member to be fixed is fixed more firmly, and is prevented from randomly moving in the ring area. For example, if the second strap is made of the flexible materials, after the second strap is bent in a direction close to the first strap, a protruding part of the snapping part may be located on an outer side of the connecting section, thereby avoiding influences on the member to be fixed. Optionally, the snapping hole may also be located in the side, away from the limiting part, of the connecting section.

In some embodiments, the first strap includes a strap body and a plurality of locking teeth arranged in a length direction of the strap body, and second locking teeth are arranged on an inner wall of the snapping hole. When the first strap and the second strap are connected, the second locking teeth and at least part of the first locking teeth are in snap-fit, thereby connecting the first strap and the second strap.

In this embodiment, the first strap and the second strap are respectively provided with the first locking teeth and the second locking teeth, and the first strap and the second strap can be connected through snapping-fit of the first locking teeth and the second locking teeth, which can ensure a snap-fit effect on the member to be fixed and prevent loosening.

In some embodiments, the height size of the first locking tooth is greater than the size, in the radial direction of the snapping hole, of a gap between the top of the second locking tooth and the side wall of the snapping hole.

In this embodiment, after the first locking teeth and the second locking teeth are snapped fit, the first locking teeth can be prevented from disengaging from the second locking teeth during vibration or impact, thereby improving fixing reliability.

In some embodiments, a plurality of first locking teeth are arranged on a surface, towards the second strap, of the strap body.

In this embodiment, firmness of fixing the member to be fixed by the cable tie device can be enhanced through meshing between the first locking teeth and a surface of the member to be fixed, and accordingly, the member to be fixed is prevented from randomly moving in the ring, thereby avoiding influences on fixing reliability.

In some embodiments, before the connecting bars deform, the limiting part is spaced from the first side surface of the body part by a preset distance.

In this embodiment, before the cable tie device is installed, the limiting part is spaced from the first side surface of the body part by the preset distance, the length that the connecting bars penetrate through the second through hole in the mounting plate is reserved, and meanwhile, the connecting bars can be long enough, such that when the first strap is pulled outwards, an outward protruding structure is formed by the at least two connecting bars so as to achieve the limiting effect.

In some embodiments, before the connecting bars deform, the shape defined by the at least two connecting bars is gradually shrunk from the body part to the limiting part.

In this embodiment, when the first strap is pulled outwards, the connecting bars are more likely to be outwards bent to form the protruding structure, and when the cable tie device is disassembled, after the first strap and the second strap are disconnected, the limiting part is more likely to recover to an initial position, and as a result, the limiting part and the connecting bars can be taken out of the second through hole in the mounting plate. The structure is more beneficial to assembly and disassembly of the cable tie device.

According to a second aspect of the present application, a cable tie connection structure is provided and includes:
a member to be fixed;
a mounting plate; and
the cable tie device in the above embodiment, where the cable tie device is configured to fix the member to be fixed to the mounting plate.

In this embodiment, the body part of the cable tie device may be fixed to the mounting plate through deformation of the connecting bars, which is easy to install and not prone to disengaging due to firm installation, and the installer does not need to apply great force. Moreover, the connecting bars are bent and deformed to protrude outwards, which prevents the body part from disengaging from the mounting plate and can reliably fix the member to be fixed. In addition, after the connecting bars recover to an initial state, the cable tie device can be dismounted, which can prevent the mounting plate from being damaged or prevent part of structures of the cable tie device from remaining in the mounting plate. Therefore, the kind of cable tie device is convenient to disassemble and assemble, which can improve disassembly and assembly efficiency and reduce operation difficulty.

In some embodiments, the mounting plate is provided with a second through hole, the body part abuts against the second side surface, towards the member to be fixed, of the mounting plate, and the limiting part and the at least two connecting bars penetrate through the second through hole and are located in the first side, away from the member to be fixed, of the mounting plate.

In this embodiment, when the member to be fixed is fixed by the cable tie device, the limiting part and the at least two connecting bars may first penetrate through the second through hole, and thus, after the first strap is outwards pulled to be connected to the second strap, the at least two connecting bars are bent to perform limiting together with the limiting part on the side, away from the member to be fixed, of the mounting plate, thereby facilitating fixing of the cable tie device and the mounting plate.

In some embodiments, the size of the second through hole is not smaller than a maximum boundary dimension defined by joints of the at least two connecting bars and the body part, and the size of the second through hole is constructed to prevent the at least two connecting bars from arriving at the second side of the mounting plate.

In this embodiment, the appropriate size is set for the second through hole, which can make the connecting bars smoothly penetrate through the second through hole when the cable tie device is required to be installed so as to make the body part abut against the mounting plate to be stably fixed, and meanwhile prevent the bent and deformed connecting bars from coming out of the second through hole, thereby improving reliability of fixing the member to be fixed, and preventing loosening.

According to a third aspect of the present application, a battery is provided and includes:
- a box body, a battery cell, a member to be fixed and the cable tie device in the above embodiment, where the battery cell is arranged in the box body, the box body has the mounting plate, and the cable tie device is configured to fix the member to be fixed to the mounting plate; or
- a box body, a battery cell and the cable tie connection structure in the above embodiment, where the mounting plate is a part of the box body of the battery.

In some embodiments, the box body has a bottom plate, the bottom plate includes a first plate and a second plate arranged spaced from each other in a thickness direction, a cavity is formed between the first plate and the second plate, the second plate is located on the side, away from the battery cell, of the first plate, the first plate is used as the mounting plate, and the limiting part and the at least two connecting bars are located in the cavity.

In this embodiment, the bottom plate of the box body is of a double-layer structure, the second plate can protect the first plate, and if the battery is used for a vehicle and installed at a bottom of a frame, foreign matter can be prevented from impacting on the first plate so as to protect the battery cell and prevent the battery cell from being deformed. The cable tie device is fixed to the mounting plate, such that the limiting part and the at least two connecting bars in a bending state can be located in the cavity, the cavity is sufficiently utilized, and there is no need to occupy additional space; and meanwhile, the limiting part and the at least two connecting bars can be protected and be prevented from being fractured by the external acting force, thereby improving fixing reliability of the cable tie device.

According to a fourth aspect of the present application, an electrical apparatus is provided, and includes the battery in the above embodiment, and the battery is used to provide electric energy for the electrical apparatus.

DESCRIPTION OF DRAWINGS

In order to illustrate the technical solutions of the embodiments of the present application more clearly, the drawings required in the embodiments of the present application are briefly introduced. Obviously, the drawings described below are only some embodiments of the present application. For those of ordinary skill in the art, other drawings can also be obtained according to the drawings without any creative effort.

Figure 1:
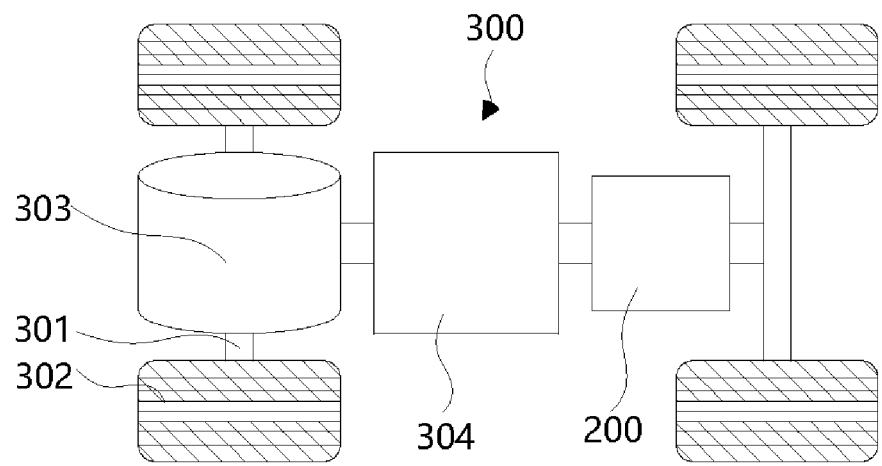
FIG. 1 is a structural schematic diagram of installing a battery into a vehicle according to some embodiments of the present application.

In the drawings, the drawings are not drawn to actual scale.

DESCRIPTION OF REFERENCE NUMERALS

100-cable tie device; 1-body part; A-first side surface; 11-first through hole; 2-limiting part; 3-connecting bar; 4-first strap; 41-strap body; 42-first locking tooth; 421-first surface; 422-second surface; 5-second strap; 51-connecting section; 52-snapping part; 522A-third surface; 522B-fourth surface; 521-snapping hole; 522-second locking tooth; 10-mounting plate; 101-second through hole; 20-member to be fixed; 200-battery; 201-box body; 201A-first half shell; 201B-second half shell; 201'-bottom plate; 2011-first plate; 2012-second plate; Q-cavity; 202'-battery module; 202-battery cell; 300-vehicle; 301-axle; 302-wheel; 303-motor; and 304-controller.

DETAILED DESCRIPTION

The implementations of the present application are further described in detail below in combination with the drawings and embodiments. The detailed description of the following embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; orientation or positional relationships indicated by terms such as "upper", "lower", "left", "right", "inner" and "outer" are only for facilitating the description of the present application and simplifying the description, rather than indicating or implying that an apparatus or element referred to must have a particular orientation or be constructed and operated in a particular orientation, and therefore will not be interpreted as limiting the present application.

In addition, the terms such as "first", "second" and "third" are only used for describing purposes, but cannot be understood as indicating or implying relative importance. "Vertical" is not strictly vertical, but within the allowable range of error. "Parallel" is not strictly parallel, but within the allowable range of error. Orientation words appearing in the following description are all directions shown in the drawings, but do not limit a specific structure of the present application.

In the description of the present application, it should be further noted that, the terms "mounting", "connecting" and "connection" should be understood in a broad sense, unless otherwise explicitly specified or defined. For example, it may be a fixed connection, a detachable connection, or an integrated connection; and it may be a direct connection or an indirect connection through an intermediate medium. For those of ordinary skill in the art, the specific meanings of the above terms in the present application may be understood according to specific circumstances.

Reference herein to "an embodiment" means that a particular feature, structure, or characteristic described in combination with the embodiment can be included in at least some embodiments of the present application. The appearance of this phrase in various places in the specification does not necessarily refer to the same embodiment, nor is it a separate or alternative embodiment that is mutually exclusive from other embodiments. It is explicitly and implicitly understood by those skilled in the art that the embodiments described herein may be combined with other embodiments.

In the description of the embodiments of the present application, the term "plurality of" refers to two or more (including two), and similarly, "multiple groups" refers to two or more groups (including two groups), and "multiple sheets" refers to two or more sheets (including two sheets).

The present application adopts the description of orientation or positional relationships indicated by "upper", "lower", "top", "bottom", "front", "back", "inner", "outer", etc. only for facilitating the description of the present application, rather than indicating or implying that the apparatus referred to must have a particular orientation or be constructed and operated in a particular orientation, and therefore will not be interpreted as limiting the scope of protection of the present application.

The battery mentioned in the embodiments of the present application refers to a single physical module including one or more battery cells to provide a higher voltage and capacity. For example, the battery mentioned in the present application may include a battery module, or a battery pack, or the like.

The battery cell may include a lithium-ion secondary battery, a lithium-ion primary battery, a lithium-sulfur battery, a sodium-lithium-ion battery, a sodium-ion battery, or a magnesium-ion battery, or the like, which is not limited by the embodiments of the present application. The battery cell may be in a cylindrical, flat or rectangular solid shape or in other shapes, which is also not limited by the embodiments of the present application. The battery cells are generally divided into three types according to packaging manners: cylindrical battery cells, prismatic battery cells and pouch battery cells, which are also not limited by the embodiments of the present application.

A current battery cell generally includes a case and an electrode assembly accommodated in the case, and the case is filled with an electrolyte. The electrode assembly is mainly formed by stacking or winding a first pole piece and a second pole piece with opposite polarities, and a diaphragm is usually arranged between the first pole piece and the second pole piece. The parts, coated with active materials, of the first pole piece and the second pole piece constitute a body part of the electrode assembly, and the parts, uncoated with active materials, of the first pole piece and the second pole piece constitute a first tab and a second tab respectively. In the lithium-ion battery, the first pole piece may be a positive pole piece, including a positive electrode current collector and a positive electrode active material layer arranged on both sides of the positive electrode current collector, the material of the positive electrode current collector may be aluminum, and the positive electrode active material may be lithium cobalt oxide, lithium iron phosphate, ternary lithium or lithium manganate, etc.; the second pole piece may be a negative pole piece, including a negative electrode current collector and a negative electrode active material layer arranged on both sides of the negative electrode current collector, the material of the negative electrode current collector may be copper, and the negative electrode active material may be graphite or silicon, etc. The first tab and the second tab may be located at one end of the body part together or at two ends of the body part respectively. During the charge and discharge process of the battery cell, the positive electrode active material and the negative electrode active material react with the electrolyte solution, and the tabs are connected to terminals to form a current loop.

In order to fix a pipeline etc. on a mounting plate, a cable tie device in the existing battery generally uses a circular tower-like structure or a metal embedded clamping structure to fix the pipeline, etc. in a hole of the mounting plate. The inventor found in practice that a cable tie with the structure has at least the following problems: a large external force is required for pressing, the operation is difficult, reliable pressing of the cable tie to the mounting plate cannot be effectively guaranteed, and the cable tie is likely to loosen after long-term use. Moreover, when the cable tie is disassembled, the circular tower-like structure or the metal embedded clamping structure is required to be pulled out from the hole of the mounting plate, which is difficult to disassemble and pull out. During forcible disassembling, part of the structure of the cable tie is likely to break and remain in the mounting plate.

Based on the discovery of the above technical problems, it is currently necessary to design an easy-to-disassemble cable tie device, and the inventor has noticed that a connection method between the cable tie and the mounting plate is an important factor for realizing convenient disassembly and assembly. Therefore, based on this idea, the present application intends to improve a connection structure between the cable tie and the mounting plate to realize quick disassembly and assembly of the cable tie.

The battery in the present application may be used for electrical apparatuses and provide electric energy for the electrical apparatuses, such as a mobile phone, a portable device, a laptop, a battery vehicle, an electric vehicle, a ship, a spacecraft, an electric toy and an electric tool. For example, the spacecraft includes an airplane, a rocket, a space shuttle, a spaceship and the like; the electric toy includes a fixed or mobile electric toy, such as a game console, an electric vehicle toy, an electric ship toy, an electric aircraft toy and the like; and the electric tool includes a metal-cutting electric tool, a grinding electric tool, an assembly electric tool and a railway electric tool, such as an electric drill, an electric grinder, an electric wrench, an electric screwdriver, an electric hammer, an electric impact drill, a concrete vibrator and an electric planer.

As shown in FIG. 1, the electrical apparatus may be a vehicle 300, such as a new-energy vehicle. The new-energy vehicle may be an all-electric vehicle, a hybrid vehicle, an extended-range electric vehicle, etc.; or the electrical apparatus may also be an unmanned aerial vehicle or a ship, or the like. Specifically, the vehicle 300 may include axles 301, wheels 302 connected to the axles 301, a motor 303, a controller 304 and a battery 200, the motor 303 is used to drive the axles 301 to rotate, the controller 304 is used to control the operation of the motor 303, and the battery 200 may be arranged at a bottom, head or tail of the vehicle 300 to provide electric energy for the operation of the motor 303 and other components in the vehicle.

Figure 2:
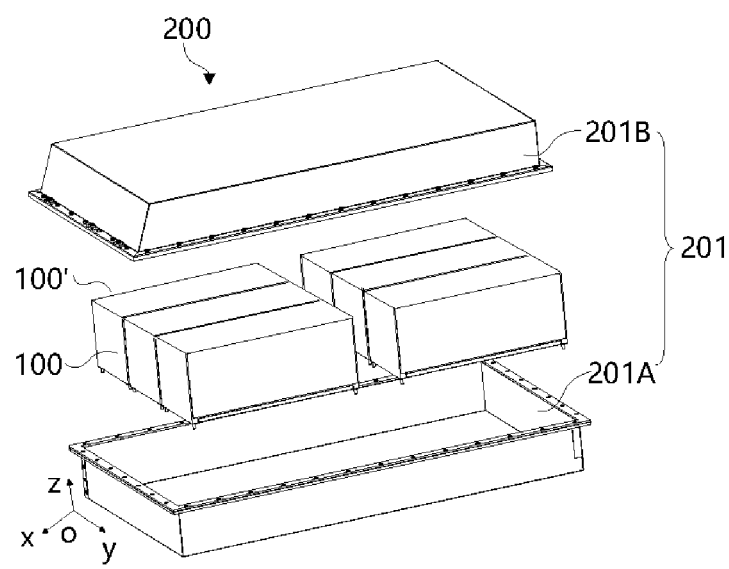
FIG. 2 is an exploded view of a battery according to some embodiments of the present application.

FIG. 2 is a schematic structural diagram of a battery 200 according to some embodiments of the present application. The battery 200 includes a box body 201 and a battery cell 202. There may be one or more battery cells 202 in the battery 200. If there are a plurality of battery cells 202, the plurality of battery cells 202 may be connected in series or in parallel or be in parallel-series connection. The parallel-series connection refers to series connection and parallel connection of the plurality of battery cells 202, or the plurality of battery cells 202 may be first connected in series or parallel or be in parallel-series connection to form battery modules, and the plurality of battery modules are then connected in series or parallel or be in parallel-series connection to form the entity to be accommodated in the box body 201. All the battery cells 202 may be directly connected in series or parallel or be in series-parallel connection, and then an entirety composed of all the battery cells 202 may be accommodated in the box body 201.

The interior of the box body 201 is of a hollow structure, and at least one battery module 202 is accommodated in the box body 201. For example, the box body 201 may include a first half shell 201A and a second half shell 201B. The first half shell 201A and the second half shell 201B are snap-fitted together. For example, both the first half shell 201A and the second half shell 201B may be hollow rectangular solids and each has only one surface being an opening surface, an opening of the first half shell 201A and an opening of the second half shell 201B are disposed opposite to each other, and the first half shell 201A and the second half shell 201B are snap-fitted together to form the box body having a closed cavity. It is also possible that the first half shell 201A is a rectangular solid with an opening while the second half shell 201B is in a plate shape, or the second half shell 201B is a rectangular solid with an opening while the first half shell 201A is in a plate shape. The first half shell 201A and the second half shell 201B are oppositely arranged and snap-fitted to form the box body having a closed cavity. The at least one battery module 202 is connected in parallel or in series or be in parallel-series combination to be placed in closed cavity formed after the first half shell 201A and the second half shell 201B are snap-fitted.

Figure 3:
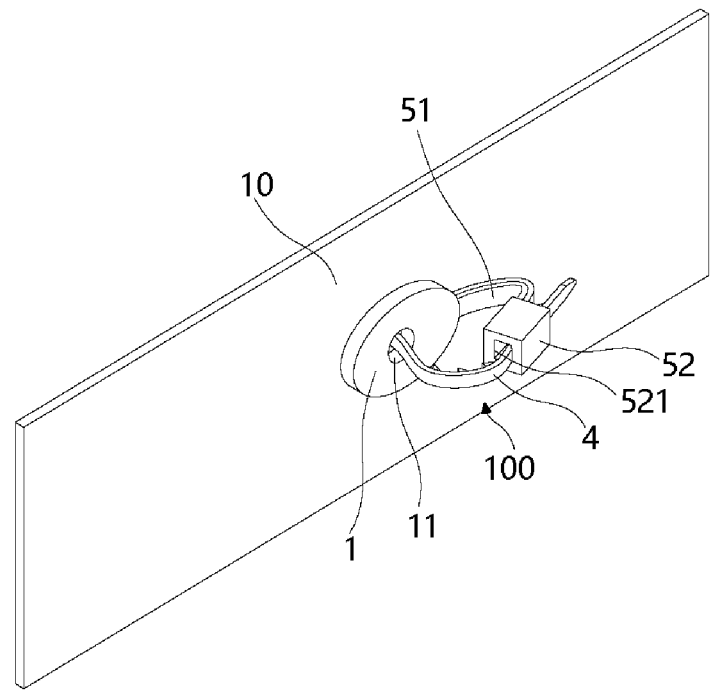
FIG. 3 is a structural schematic diagram of a cable tie connection structure according to some embodiments of the present application.
Figure 4:
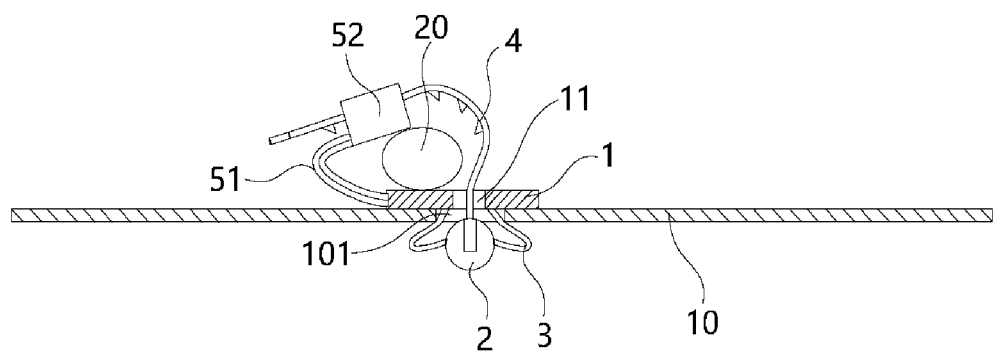
FIG. 4 is a front view of the cable tie connection structure according to the present application.
Figure 5:
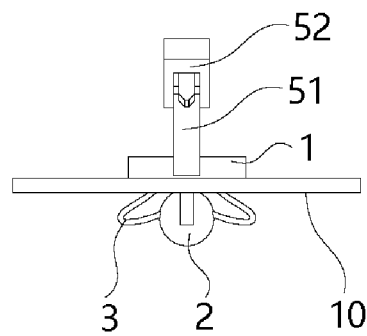
FIG. 5 is a side view of the cable tie connection structure according to the present application.

On this basis, as shown in FIG. 3 to FIG. 5, the battery 200 also includes a member to be fixed 20 and a cable tie device 100, the battery cell 202 is arranged in the box body 201, the box body 201 has a mounting plate 10, and the cable tie device 100 is configured to fix the member to be fixed 20 to the mounting plate 10, for example, the mounting plate 10 may be made of sheet metal or other materials. Or, the battery 200 further includes a cable tie connection structure, the cable tie connection structure includes a mounting plate 10, a member to be fixed 20 and a cable tie device 100, and the mounting plate 10 is a part of the box body 201 of the battery 200. The member to be fixed 20 is fixed to the mounting plate 10 of the box body 201 through the cable tie device 100, which can not only optimize layout of the member to be fixed 20, but also prevent the member to be fixed 20 from randomly moving, and meanwhile improve fixing reliability.

For example, a control wire, a current collector, or a signal line for collecting a voltage or temperature of the battery cell 202 are generally arranged in the battery 200. In order to achieve a tidy layout, part of wires will form a wiring harness, or the battery 200 may also be provided with a cooling device for cooling the battery cell 202. The cooling device may include a cooling pipe and a cooling plate. The cooling pipe is used to supply cooling liquid to the cooling plate or return liquid obtained after cooling. Therefore, there are a large number of pipelines in the battery 200, which will be subject to vibration and impact during the operation of the battery 200. In order to improve the operation safety of the battery 200, the cable tie device 100 is used to fix the pipeline member to be fixed 20 on the box body 201, which can prevent the member to be fixed 20 from randomly moving, prevent the pipelines from affecting the layout of other structures, and improve insulation and cooling reliability.

FIG. 6 to FIG. 9 show schematic structural diagrams of the cable tie device 100 before fixing the fixing member to be fixed 20.

Figure 6:
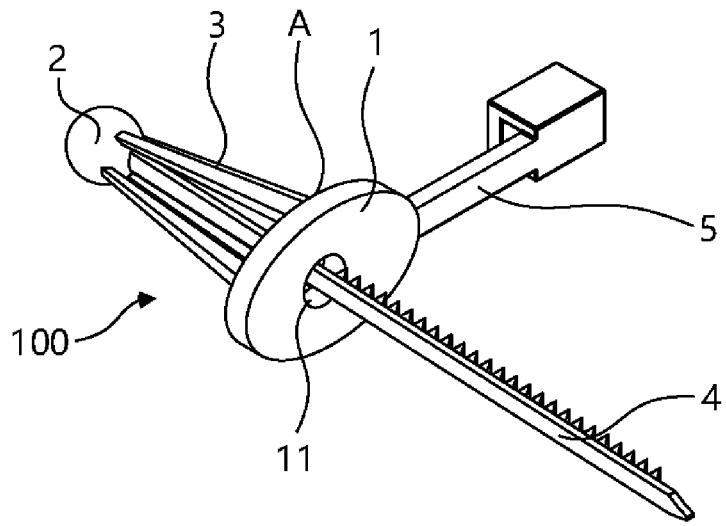
FIG. 6 is a structural schematic diagram of a cable tie device according to some embodiments of the present application.

In some embodiments, as shown in FIG. 6, the cable tie device 100 includes a body part 1, a limiting part 2, at least two connecting bars 3, a first strap 4 and a second strap 5. The body part 1 is provided with a first through hole 11, and the limiting part 2 is arranged on a first side of the body part 1 in an extending direction of the first through hole 11. Respective first ends of the at least two connecting bars 3 are connected to the limiting part 2, respective second ends of the at least two connecting bars 3 are connected to a first side surface A, towards the limiting part 2, of the body part 1, the at least two connecting bars 3 are distributed on the periphery of the first through hole 11 in a spaced manner, and the connecting bars 3 are deformable. The first strap 4 is located between the at least two connecting bars 3, a first end of the first strap 4 is connected to the limiting part 2, and a second end of the first strap 4 penetrates through the first through hole 11. The second strap 5 is connected to the body part 1.

The first strap 4 is configured to be movable in the first through hole 11 so as to drive the limiting part 2 to approach the body part 1, such that the at least two connecting bars 3 can outwards deform and protrude in a radial direction of the first through hole 11, and when the first strap 4 and the second strap 5 are in a connection state, the member to be fixed 20 is fixed.

wherein the body part 1 can be a plate-shaped structure, which can lean against the second side of the mounting plate 10 facing the to-be-fixed part 20, and the body part 1 can be rectangular, which is conducive to positioning when the cable tie device 100 is installed, or can also It can be in a circular or elliptical structure to reduce the occupied space, so that the cable tie device 100 can be applied to occasions where the space layout is relatively compact. The first through hole 11 may be provided in the middle area of the body part 1.

The limiting part 2 is arranged on the first side of the body part 1 along the extending direction of the first through hole 11, and the first side is the side away from the member to be fixed 20 during installation. Before the cable tie device 100 fixes the member to be fixed 20, there is a preset distance between the limiting part 2 and the part 20 to be fixed, and the size of the limiting part 2 is larger than the size of the first through hole 11, so as to prevent the limiting part 2 from passing through the first through hole 11 to reach the edge of the body part 1. On the second side of the extension direction of the first through hole 11, for example, the limiting part 2 can be designed as a sphere, an ellipsoid, a cuboid or other polygonal blocks, etc., as long as it can limit its entry into the first through hole 11, it is within the protection scope of the present application within.

The respective first ends of the at least two connecting bars 3 are connected to the limiting part 2, the respective second ends of the at least two connecting bars 3 are connected to the first side surface A, towards the limiting part 2, of the body part 1, and distributed on the periphery of the first through hole 11 in the spaced manner, and the connecting bars 3 are deformable and may be made of polycarbonate (short for PC) or other flexible materials. There may be two, or three, or four or more connecting bars 3 to be arranged, all the connecting bars 3 may be evenly distributed along the periphery of the first through hole 11, such that outward protruding deformation of the connecting bars 3 can be approximated, which makes connecting bars 3 likely to deform at the same time.

The first strap 4 is located in an area defined by the at least two connecting bars 3, the first end of the first strap 4 is connected to the limiting part 2, and the second end penetrates through the first through hole 11 and extends to a second side of the body part 1. For example, when the limiting part 2 is spherical, the position where the first end of the first strap 4 is connected to the limiting part 2 is located in a central area where each connecting bar 3 is connected to the limiting part 2. The size of the first through hole 11 may be larger than that of the first strap 4 so as to allow the first strap 4 to move freely in an axial direction within the first through hole 11. The second strap 5 is connected to the body part 1. For example, both the first strap 4 and the second strap 5 may be of an elongated strip structure.

The mounting plate 10 is provided with a second through hole 101, and when the member to be fixed 20 is required to be fixed by the cable tie device 100, the limiting part 2 and the at least two connecting bars 3 penetrate through the second through hole 101, and the body part 1 abuts against the side, close to the member to be fixed 20, of the mounting plate 10, applies an outward acting force to a free end of the first strap 4 so that the free end can move in the first through hole 11, so as to drive the limiting part 2 to get close to the body part 1, and accordingly, the at least two connecting bars 3 can outwards deform and protrude in the radial direction of the first through hole 11. The first strap 4 and the second strap 5 are connected, such that a ring is formed by the first strap 4, the second strap 5 and the body part 1, and accordingly the member to be fixed 20 is fixed. After fixing, the deformed at least two connecting bars 3 are located on the side, away from the member to be fixed 20, of the mounting plate 10 for limiting, which prevents the body part 1 from disengaging from the mounting plate 10 and realizes fixing between the cable tie device 100 and the mounting plate 10.

For example, the body part 1, the limiting part 2, the at least two connecting bars 3, the first strap 4 and the second strap 5 may be integrally formed, and may be made of plastic materials, such as nylon.

In this embodiment, the body part 1 of the cable tie device 100 is fixed to the mounting plate 10 through deformation of the connecting bars 3, which is easy to install and not prone to disengaging due to firm installation, and an installer does not need to apply excessive force. Moreover, after the connecting bars 3 recover to an initial state, the cable tie device 100 can be dismounted, which can prevent the mounting plate 10 from being damaged or prevent part of structures of the cable tie device 100 from remaining in the mounting plate 10. Therefore, the kind of cable tie device 100 is convenient to disassemble and assemble, which can improve disassembly and assembly efficiency and reduce operation difficulty.

In some embodiments, the size of the first through hole 11 is constructed to prevent the limiting part 2 from arriving at the second side of the body part 1 in the extending direction of the first through hole 11,
where the second side of the body part 1 is a side away from the limiting part 2. For example, the first through hole 11 is a circular hole, the limiting part 2 is a sphere, and the diameter of the first through hole 11 is smaller than the diameter of the limiting part 2.

In this embodiment, after the member to be fixed 20 is fixed, the limiting part 2 abuts against the first side surface A of the body part 1, such that the first side surface A of the body part 1 prevents the limiting part 2 from coming out of the first through hole 11, the at least two connecting bars 3 may be kept in a deformation state to prevent structure failures of a blooming structure formed by the connecting bars 3, accordingly, the body part 1 is jointly limited by the connecting bars 3 and the limiting part 2 from leaving the mounting plate 10, thereby improving fixing reliability of the cable tie device 100.

In some embodiments, a cross section of each connecting bar 3 is in an arc shape, and the arc protrudes outwards. For example, the cross section of each connection bar 3 may be designed as the arc, and "protruding outwards" means that the arc protrudes outwards in the radial direction of the first through hole 11.

In this embodiment, the connecting bars 3 are in the arc shape and protrude outwards before deformation. When the first strap 4 is pulled outwards by external force to make the limiting part 2 get close to the body part 1, it becomes easier for the at least two connecting bars 3 to protrude outwards in the radial direction of the first through hole 11 and deform, which can prevent inward bending deformation of part of the connecting bars 3 due to unbalanced stress and reduce operation difficulty.

In some embodiments, the body part 1 is of a flat plate structure. For example, the body part 1 may be of a rectangular, circular or oval flat plate structure.

In this embodiment, when the member to be fixed 20 is fixed to the mounting plate 10 through the cable tie device 100, the whole first side surface A of the body part 1 can be attached to the mounting plate 10, such that the body part 1 is more stably fixed to the mounting plate 10, the cable tie device 100 is prevented from shaking after the member to be fixed 20 is fixed, and fixing reliability can also be improved even when the cable tie device 100 is subject to vibration or impact.

In some embodiments, the at least two connecting bars 3 are evenly distributed in a circumferential direction of the first through hole 11 and are equal in length. For example, the limiting part 2 is a sphere, which facilitates the at least two connecting bars 3 to be evenly distributed in the circumferential direction and be equal in length.

In this embodiment, when the first strap 4 is pulled outwards, the connecting bars 3 can be subject to balanced stress and are likely to deform at the same time, and meanwhile, the deformation of outward protrusion of the connecting bars 3 is consistent, which can improve fixing reliability of the body part 1 on the mounting plate 10.

In some embodiments, the second strap 5 is connected to a position, located on a side surface of the first through hole 11, of the body part 1, at least one of the first strap 4 and the second strap 5 is deformable, and when the first strap 4 and the second strap 5 are connected, the first strap 4 and the second strap 5 get close to each other and are connected through deformation of at least one of them, so as to form the ring with the body part 1 for the member to be fixed 20 to penetrate through.

For example, at least one of the first strap 4 and the second strap 5 is made of the flexible materials so as to deform. Before the cable tie device 100 is fixed, the first strap 4 extends in the axial direction of the first through hole 11, and the second strap 5 is located at the position, on the side surface of the first through hole 11, of the body part 1, for example, the second strap 5 may extend in the radial direction of the first through hole 11. In order to realize the connection between the first strap 4 and the second strap 5, at least one of the first strap 4 and the second strap 5 is required to be bent, so that the free ends of the first strap 4 and the second strap 5 get close to each other to be connected. Optionally, both the first strap 4 and the second strap 5 are made of the flexible materials, such that an appropriate operating angle can be flexibly selected to connect the first strap 4 and the second strap 5.

In this embodiment, the second strap 5 is connected to a side portion of the body part 1, such that the ring can be formed after the first strap 4 and the second strap 5 are connected to accommodate the member to be fixed 20. Moreover, at least one of the first strap 4 and the second strap 5 is made of the flexible materials, such that the respective free ends of the first strap 4 and the second strap 5 are likely to get close to each other to be connected, and the size of the ring can be conveniently adjusted according to the radial size of the member to be fixed 20, thereby conveniently fixing the member to be fixed 20.

Figure 7:
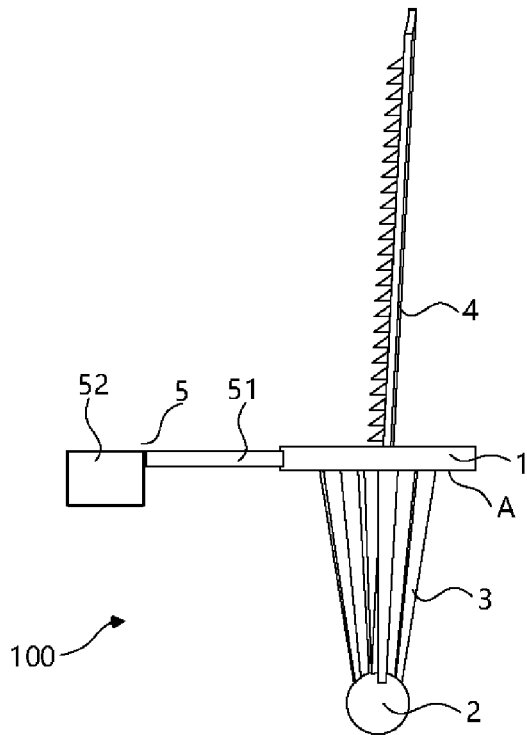
FIG. 7 is a front view of a cable tie device according to some embodiments of the present application.

In some embodiments, as shown in FIG. 7, the second strap 5 includes a connecting section 51 and a snapping part 52, where a first end of the connecting section 51 is connected to the body part 1, the snapping part 52 is connected to a second end of the connecting section 51, and the snapping part 52 is provided with a snapping hole 521. The second end of the first strap 4 penetrates through the snapping hole 521 so as to be connected to the second strap 5.

For example, the connecting section 51 may be of a strip-shaped structure, the first end of the connecting section 51 is connected to the side portion of the body part 1, and when the body part 1 is of a disc plate-shaped structure, the first end of the connecting section 51 can be connected to a side surface of the disc plate-shaped structure, and the connecting section 51 can extend in the radial direction of the first through hole 11. When the first strap 4 and the second strap 5 are required to be connected, the second end of the first strap 4 can penetrate through the snapping hole 521, and the length that the second end of the first strap 4 penetrates through the snapping hole 521 is adjusted according to the radial size of the member to be fixed 20, so as to fasten the member to be fixed 20.

In this embodiment, the first strap 4 and the second strap 5 can be conveniently connected, and during connection, the member to be fixed 20 can be fastened by adjusting the length that the second end of the first strap 4 penetrates through the snapping hole 521.

In some embodiments, as shown in FIG. 7, the snapping hole 521 is located in the side, close to the limiting part 2, of the connecting section 51. Specifically, the snapping hole 521 is located in the side, close to the limiting part 2, of the connecting section 51 in the axial direction of the first through hole 11, and the snapping part 52 is flush to the side surface, away from the limiting part 2 in the axial direction of the first through hole 11, of the connecting section 51.

In this embodiment, after the second end of the first strap 4 penetrates through the snapping hole 521, the snapping part 52 can be prevented from occupying an internal area of the ring, such that the first strap 4 and the second strap 5 better wrap the member to be fixed 20, and accordingly, the member to be fixed 20 is fixed more firmly, and is prevented from randomly moving in the ring area. For example, if the second strap 5 is made of the flexible materials, after the second strap 5 is bent in a direction close to the first strap 4, a protruding part of the snapping part 52 may be located on an outer side of the connecting section 51, thereby avoiding influences on the member to be fixed 20. Optionally, the snapping hole 521 may also be located in the side, away from the limiting part 2, of the connecting section 51.

Figure 8:
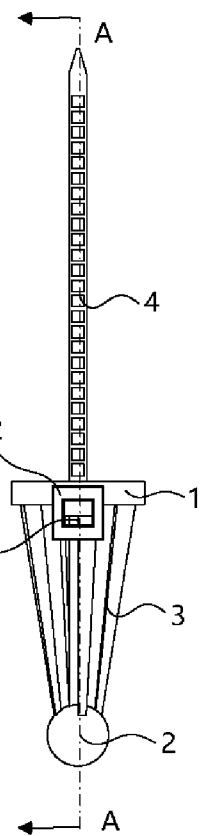
FIG. 8 is a side view of a cable tie device according to some embodiments of the present application.
Figure 9:
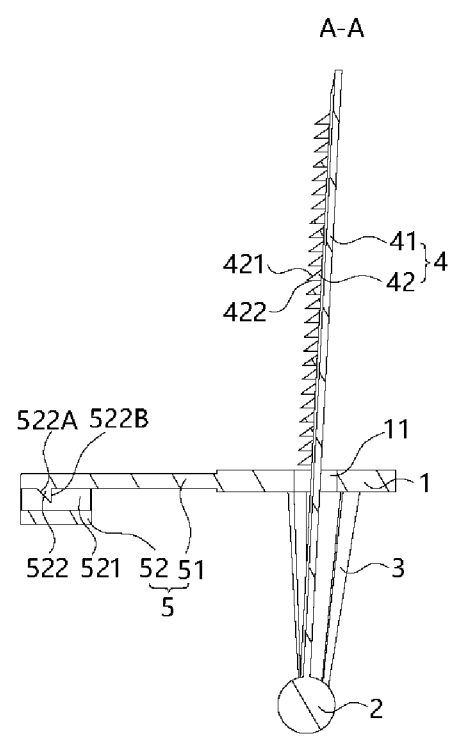
FIG. 9 is an A-A section view of FIG. 8.

In some embodiments, as shown in FIG. 8 and FIG. 9, the first strap 4 includes a strap body 41 and a plurality of locking teeth 42 arranged in a length direction of the strap body 41, and second locking teeth 522 are arranged on an inner wall of the snapping hole 521. When the first strap 4 and the second strap 5 are connected, the second locking teeth 522 and at least part of the first locking teeth 42 are in snap-fit, thereby connecting the first strap 4 and the second strap 5.

For example, the first locking teeth 42 and the second locking teeth 522 may be of a triangular structure, the second locking teeth 522 may be embedded between two adjacent first locking teeth 42, and by adopting the triangular locking teeth, a good anti-disengaging function can be achieved after installation. Specifically, a first surface 421 and a second surface 422 are arranged on both sides, in an extending direction of the strap body 41, of the first locking tooth 42 respectively, the first surface 421 is away from the body part 1 and is obliquely arranged relative to the strap body 41, and the second surface 421 is close to the body part 1 and is perpendicular to the strap body 41. A third surface 522A and a fourth surface 522B are arranged on both sides, in an axial direction of the snapping hole 521, of the second locking tooth 522 respectively, the third surface 522A is away from the body part 1 and is obliquely arranged relative to the snapping hole 521, and the fourth surface 522B is close to the body part 1 and is perpendicular to the inner wall of the snapping hole 521.

When the second end of the first strap 4 penetrates through the snapping hole 521, the first surface 421 is matched with the third surface 522A through a slope, which may allow the second end of the first strap 4 to slide in a direction stretching into the snapping hole 521, so as to adapt to the radial size of the member to be fixed 20. Further, the second surface 422 is matched with the fourth surface 522B through a straight surface, the first strap 4 is prevented from being pulled out due to a limiting effect, and thus, after the first strap 4 is inserted into the snapping hole 521 by a proper length, the first strap 4 can be prevented from coming out of the snapping hole 521, thereby improving reliability of fixing the member to be fixed 20 by the cable tie device 100.

For example, an end portion of the strap body 41 of the first strap 4 may be designed into a triangular shape, and a sharp position is provided with a rounded corner, which facilitates the first strap 4 to be inserted into the snapping hole 521, can also prevent the sharp portion from stabbing an operator, and improves operation safety.

In this embodiment, the first strap 4 and the second strap 5 are provided with the first locking teeth 42 and the second locking teeth 522 respectively, and the first strap 4 and the second strap 5 can be connected through snapping-fit of the first locking teeth 42 and the second locking teeth 522, which can ensure a snap-fit effect on the member to be fixed 20 and prevent loosening.

In some embodiments, the height size of the first locking tooth 42 is greater than the size, in the radial direction of the snapping hole 521, of a gap between the top of the second locking tooth 522 and the side wall of the snapping hole 521.

In this embodiment, after the first locking teeth 42 and the second locking teeth 522 are snapped fit, the first locking teeth 42 can be prevented from disengaging from the second locking teeth 522 during vibration or impact, thereby improving fixing reliability.

In some embodiments, as shown in FIG. 9, the plurality of first locking teeth 42 are arranged on a surface, towards the second strap 5, of the strap body 41, and the kind of structure can make the first locking teeth 42 arranged towards the member to be fixed 20 after the first strap 4 and the second strap 5 are connected into the ring. Correspondingly, the second locking teeth 522 are arranged on the side wall of the snapping hole 521 and are arranged close to the connecting section 51 in the circumferential direction.

In this embodiment, firmness of fixing the member to be fixed 20 by the cable tie device 100 can be enhanced through meshing between the first locking teeth 42 and a surface of the member to be fixed 20, and accordingly, the member to be fixed 20 is prevented from randomly moving in the ring, thereby avoiding influences on fixing reliability.

In some embodiments, as shown in FIG. 9, before the connecting bars 3 deform, the limiting part 2 is spaced from the first side surface A of the body part 1 by a preset distance.

In this embodiment, before the cable tie device 100 is installed, the limiting part 2 is spaced from the first side surface A of the body part 1 by the preset distance, the length that the connecting bars 3 penetrate through the second through hole 101 in the mounting plate 10 is reserved, and meanwhile, the connecting bars 3 can be long enough, such that when the first strap 4 is pulled outwards, an outward protruding structure is formed by the at least two connecting bars 3 so as to achieve the limiting effect.

In some embodiments, before the connecting bars 3 deform, the shape defined by the at least two connecting bars 3 is gradually shrunk from the body part 1 to the limiting part 2. For example, four connecting bars 3 are arranged in FIG. 9 to define a cone.

In this embodiment, when the first strap 4 is pulled outwards, the connecting bars 3 are more likely to be outwards bent to form the protruding structure, and when the cable tie device 100 is disassembled, after the first strap 4 and the second strap 5 are disconnected, the limiting part 2 is more likely to recover to an initial position, and as a result, the limiting part 2 and the connecting bars 3 can be taken out of the second through hole 101 in the mounting plate 10. The structure is more beneficial to assembly and disassembly of the cable tie device 100.

Secondly, the present application provides a cable tie connection structure. In some embodiments, as shown in FIG. 3 to FIG. 5, the cable tie connection structure includes a member to be fixed 20, a mounting plate 10 and the cable tie device 100 in the above embodiment, and the cable tie device 100 is configured to fix the member to be fixed 20 to the mounting plate 10. For example, the mounting plate 10 may be of a sheet metal structure or another hard plate, and the member to be fixed 20 may be a pipeline or the like.

In this embodiment, the body part 1 of the cable tie device 100 may be fixed to the mounting plate 10 through deformation of the connecting bars 3, which is easy to install and not prone to disengaging due to firm installation, and the installer does not need to apply excessive force. Moreover, the connecting bars 3 are bent and deformed to protrude outwards, which prevents the body part 1 from disengaging from the mounting plate 10 and can reliably fix the member to be fixed 20. In addition, after the connecting bars 3 recover to an initial state, the cable tie device 100 can be dismounted, which can prevent the mounting plate 10 from being damaged or prevent part of structures of the cable tie device 100 from remaining in the mounting plate 10. Therefore, the kind of cable tie device 206 is convenient to disassemble and assemble, which can improve disassembly and assembly efficiency and reduce operation difficulty.

In some embodiments, as shown in FIG. 4, the mounting plate 10 is provided with the second through hole 101, the body part 1 abuts against the second side surface, towards the member to be fixed 20, of the mounting plate 10, and the limiting part 2 and the at least two connecting bars 3 penetrate through the second through hole 101 and are located in the first side, away from the member to be fixed 20, of the mounting plate 10.

In this embodiment, when the member to be fixed 20 is fixed by the cable tie device 100, the limiting part 2 and the at least two connecting bars 3 may first penetrate through the second through hole 101, and thus, after the first strap 4 is outwards pulled to be connected to the second strap 5, the at least two connecting bars 3 are bent to perform limiting together with the limiting part 2 on the side, away from the member to be fixed 20, of the mounting plate 10, thereby facilitating fixing of the cable tie device 100 and the mounting plate 10.

In some embodiments, as shown in FIG. 4, the size of the second through hole 101 is not smaller than a maximum boundary dimension defined by joints of the at least two connecting bars 3 and the body part 1, and the size of the second through hole 101 is constructed to prevent the at least two connecting bars 3 from arriving at the second side of the mounting plate 10.

For example, the second through hole 101 may be a circular hole, that is, the diameter of the second through hole 101 is not smaller than the maximum diameter of a circle defined by joints of the at least two connecting bars 3 and the body part 1; and the diameter of the second through hole 101 is smaller than the maximum diameter of a circle defined by the at least two bent connecting bars 3 at the protruding position so as to prevent the at least two connecting bars 3 from coming out of the second through hole 101.

In this embodiment, the appropriate size is set for the second through hole 101, which can make the connecting bars 3 smoothly penetrate through the second through hole 101 when the cable tie device 100 is required to be installed so as to make the body part 1 abut against the mounting plate 10 to be stably fixed, and meanwhile prevent the bent and deformed connecting bars 3 from coming out of the second through hole 101, thereby improving reliability of fixing the member to be fixed 20, and preventing loosening.

Figure 10:
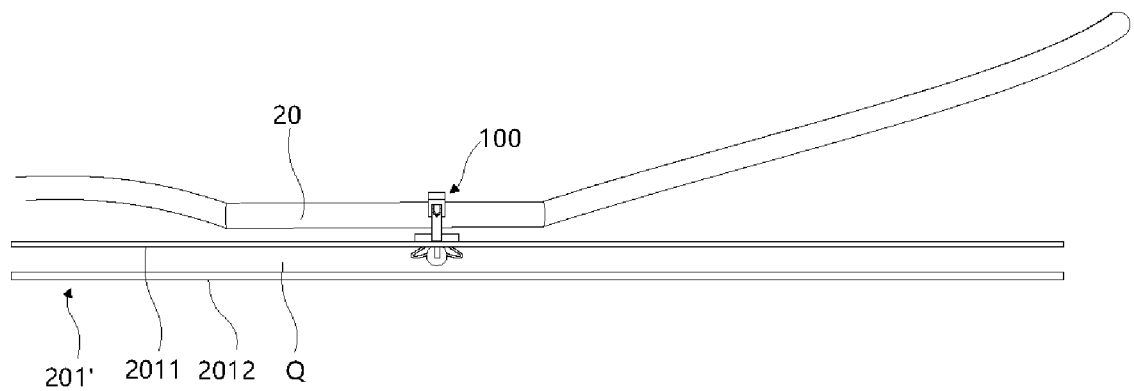
FIG. 10 is a front view of a cable tie device for a battery according to some embodiments of the present application.
Figure 11:
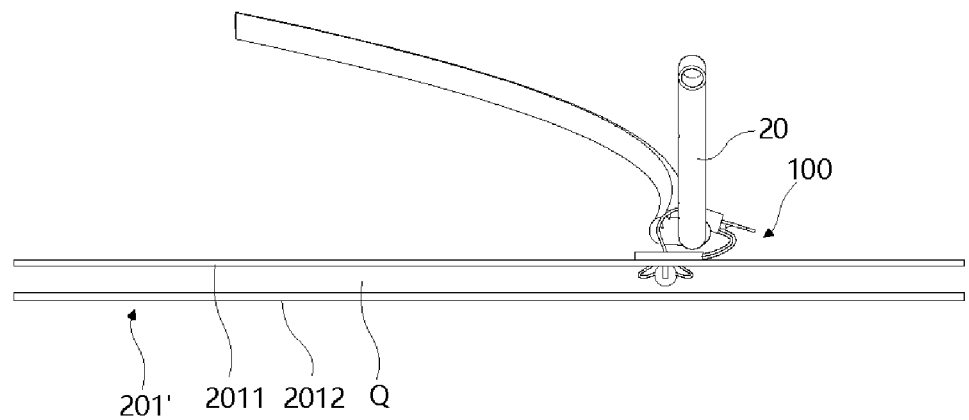
FIG. 11 is a side view of a cable tie device for a battery according to some embodiments of the present application.

In some embodiments, as shown in FIG. 10 and FIG. 11, the above-mentioned cable tie device 100 or the cable tie connection structure may be used in the battery 200. The box body 201 of the battery 200 has a bottom plate 201', the bottom plate 201' includes a first plate 2011 and a second plate 2012 arranged spaced from each other in a thickness direction of the bottom plate 201', a cavity Q is formed between the first plate 2011 and the second plate 2012, the second plate 2012 is located on the side, away from the battery cell 202, of the first plate 2011, the first plate 2011 is used as the mounting plate 10 which is provided with the second through hole 101, and in the state that the cable tie device 100 fixes the member to be fixed 20, the limiting part 2 and the at least two connecting bars 3 are located in the cavity Q.

In this embodiment, the bottom plate 201' of the box body 201 is of a double-layer structure, the second plate 2012 can protect the first plate 2011, and if the battery 200 is used for a vehicle and installed at a bottom of a frame, foreign matter can be prevented from impacting on the first plate 2011, so as to protect the battery cell 202 and prevent the battery cell 202 from being deformed. The cable tie device 100 is fixed to the mounting plate 10, such that the limiting part 2 and the at least two connecting bars 3 in a bending state can be located in the cavity Q, the cavity Q is sufficiently utilized, and there is no need to occupy additional space; and meanwhile, the limiting part 2 and the at least two connecting bars 3 can be protected and be prevented from being fractured by the external acting force, thereby improving fixing reliability of the cable tie device 100.

The specific structure and an application method of the cable tie device 100 of the present application are described below with reference to FIG. 3 to FIG. 9.

FIG. 6 to FIG. 9 are state diagrams of the cable tie device 100 before installation. The cable tie device 100 includes a body part 1, a limiting part 2, at least two connecting bars 3, a first strap 4 and a second strap 5.

The body part 1 may be of a flat plate structure, such as a circular or elliptical plate structure, the body part 1 is provided with a first through hole 11, and the first through hole 11 may be a circular hole, a rectangular hole, etc. The limiting part 2 is arranged on a first side of the body part 1 in an extending direction of the first through hole 11, and is spaced from the body part 1 by a preset distance. Respective first ends of the at least two connecting bars 3 (e.g., four connecting bars 3 are arranged) are connected to the limiting part 2, respective second ends of the at least two connecting bars 3 are connected to a first side surface A, towards the limiting part 2, of the body part 1, the at least two connecting bars 3 are distributed on the periphery of the first through hole 11 in a spaced manner, and the connecting bars 3 are deformable.

The first strap 4 is located between the at least two connecting bars 3, a first end of the first strap 4 is connected to the limiting part 2, and a second end of the first strap 4 penetrates through the first through hole 11. The first strap 4 includes a strap body 41 and a plurality of first locking teeth 42 arranged in a length direction of the strap body 41.

The second strap 5 is connected to a position, located on a side surface of the first through hole 11, of the body part 1. The second strap 5 includes a connecting section 51 and a snapping part 52, where a first end of the connecting section 51 is connected to the body part 1 and is capable of extending in a radial direction of the first through hole 11, the snapping part 52 is connected to a second end of the connecting section 51, and the snapping part 52 is provided with a snapping hole 521. An inner wall of the snapping hole 521 is provided with second locking teeth 522, and the first locking teeth 42 and the second locking teeth 522 may be of a triangular or trapezoid structure.

FIG. 3 to FIG. 5 are state diagrams of the cable tie device 100 after installation. In order to make the cable tie device 100 fix the member to be fixed 20 to the mounting plate 10, the mounting plate 10 is provided with a second through hole 101, the size of the second through hole 101 is smaller than the maximum boundary dimension of the body part 1 and smaller than the maximum boundary dimension defined by protruding positions of the at least two connecting bars 3 after bending; and the size of the second through hole 101 is greater than that of the first through hole 11 and not smaller than the maximum boundary dimension defined by joints of the at least two connecting bars 3 and the body part 1, and the maximum diameter of a circle defined by the protruding positions after bending.

When the cable tie device 100 fixes the member to be fixed 20, the limiting part 2 and the at least two connecting bars 3 first penetrate through the second through hole 101, and the body part 1 abuts against a side surface, towards the member to be fixed 20, of the mounting plate 10; then, the first strap 4 is outwards pulled to drive the limiting part 2 to approach the mounting plate 10, meanwhile, the at least two connecting bars 3 are bent and outwards protrude, and then a second end of the first strap 4 penetrates through the snapping hole 521; and finally, the first strap 4 is continuously pulled to make the first locking teeth 42 and the second locking teeth 522 snapped at a proper position so as to fix the member to be fixed 20, the limiting part 2 abuts against the first side surface A of the body part 1 through the second through hole 101, at the time, under the extrusion action of the limiting part 2, the at least two connecting bars 3 are kept in an outward protruding state so as to limit the body part 1 from disengaging from the mounting plate 10, and the cable tie device 100 stably and reliably fixes the member to be fixed 20 to the mounting plate 10.

When the cable tie device 100 is required to be disassembled, the first strap 4 and the second strap 5 are cut apart, tension exerted on the limiting part 2 by the first strap 4 disappears, the limiting part 2 and the at least two connecting bars 3 recover to the initial position, the connecting bars 3 are straightened, the body part 1 is taken down from the mounting plate 10, and meanwhile, the limiting part 2 and the at least two connecting bars 3 come out of the second through hole 101, thereby realizing disassembly of the cable tie device 100.

Although the present application has been described with reference to the preferred embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A cable tie device comprising:
a body part provided with a first through hole;
a limiting part arranged on a first side of the body part in an extending direction of the first through hole;
at least two connecting bars with respective first ends connected to the limiting part and respective second ends connected to a first side surface, towards the limiting part, of the body part, wherein the connecting bars are distributed on the periphery of the first through hole at intervals and are deformable;
a first strap located between the at least two connecting bars, wherein a first end of the first strap is connected to the limiting part, and a second end of the first strap penetrates through the first through hole; and
a second strap connected to the body part,
wherein the first strap is configured to be movable in the first through hole so as to drive the limiting part to approach the body part, such that the at least two connecting bars can outwards deform and protrude in a radial direction of the first through hole, and when the first strap and the second strap are in a connection state, a member to be fixed is fixed.

2. The cable tie device according to claim 1, wherein the size of the first through hole is constructed to prevent the limiting part from arriving at a second side of the body part in the extending direction of the first through hole.

3. The cable tie device according to claim 1, wherein a cross section of each connecting bar is in an arc shape, and the arc protrudes outwards.

4. The cable tie device according to claim 1, wherein the body part is of a flat plate structure.

5. The cable tie device according to claim 1, wherein the at least two connecting bars are evenly distributed in a circumferential direction of the first through hole and are equal in length.

6. The cable tie device according to claim 1, wherein the second strap is connected to a position, located on a side surface of the first through hole, of the body part, at least one of the first strap and the second strap is deformable, and when the first strap and the second strap are connected, the first strap and the second strap get close to each other and are connected through deformation of at least one of them, so as to form a ring together with the body part for the member to be fixed to penetrate through.

7. The cable tie device according to claim 6, wherein the second strap comprises:
   a connecting section with a first end connected to the body part; and
   a snapping part connected to a second end of the connecting section, and provided with a snapping hole,
   wherein the second end of the first strap penetrates through the snapping hole so as to be connected to the second strap.

8. The cable tie device according to claim 7, wherein the snapping hole is located in the side, close to the limiting part, of the connecting section.

9. The cable tie device according to claim 7, wherein the first strap comprises a strap body and a plurality of first locking teeth arranged in a length direction of the strap body, an inner wall of the snapping hole is provided with second locking teeth, and when the first strap is connected to the second strap, the second locking teeth and at least part of the first locking teeth are in snap-fit, such that the first strap is connected to the second strap.

10. The cable tie device according to claim 9, wherein the height size of the first locking tooth is greater than the size, in a radial direction of the snapping hole, of a gap between the top of the second locking tooth and the side wall of the snapping hole.

11. The cable tie device according to claim 9, wherein the plurality of first locking teeth are arranged on a surface, towards the second strap, of the strap body.

12. The cable tie device according to claim 1, wherein before the connecting bars deform, the limiting part is spaced from the first side surface of the body part by a preset distance.

13. The cable tie device according to claim 12, wherein before the connecting bars deform, the shape defined by the at least two connecting bars is gradually shrunk from the body part to the limiting part.

14. A cable tie connection structure comprising:
    a member to be fixed;
    a mounting plate; and
    the cable tie device according to claim 1, wherein the cable tie device is configured to fix the member to be fixed to the mounting plate.

15. The cable tie connection structure according to claim 14, wherein the mounting plate is provided with a second through hole, the body part abuts against a second side surface, towards the member to be fixed, of the mounting plate, and the limiting part and the at least two connecting bars (3) penetrate through the second through hole and are located on a first side, away from the member to be fixed, of the mounting plate.

16. The cable tie connection structure according to claim 15, wherein the size of the second through hole is not smaller a maximum boundary dimension defined by joints of the at least two connecting bars and the body part, and the size of the second through hole is constructed to prevent the at least two connecting bars from arriving at a second side of the mounting plate.

17. A battery comprising:
    a box body, a battery cell, a member to be fixed and the cable tie device according to claim 1, wherein the battery cell is arranged in the box body, the box body has a mounting plate, and the cable tie device is configured to fix the member to be fixed to the mounting plate.

18. The battery according to claim 17, wherein the box body has a bottom plate, and the bottom plate comprises a first plate and a second plate arranged spaced from each other in a thickness direction, a cavity is formed between the first plate and the second plate, the second plate is located on the side, away from the battery cell, of the first plate, the first plate serves as the mounting plate, and the limiting part and the at least two connecting bars are located in the cavity.

19. An electrical apparatus comprising the battery according to claim 17, wherein the battery is used to provide electric energy for the electrical apparatus.

* * * * *